United States Patent
Mercx et al.

(10) Patent No.: US 6,214,916 B1
(45) Date of Patent: Apr. 10, 2001

(54) COMPOSITION FOR LASER MARKING

(75) Inventors: Franciscus P. M. Mercx; Hendrik Verhoogt, both of Bergen op Zoom; Cor van der Zalm, Heerle, all of (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/069,261

(22) Filed: Apr. 29, 1998

(51) Int. Cl.⁷ ................ C08J 3/00; C08K 3/00; C08K 3/38; C08L 51/00; C08L 67/00
(52) U.S. Cl. ............ 524/404; 430/56; 430/127; 430/200; 430/495.1; 430/945; 523/137; 524/394; 524/401; 524/405; 524/414; 524/432; 524/539
(58) Field of Search .................. 524/539, 401, 524/404, 405, 414, 432, 394; 523/137; 430/56, 127, 200, 495.1, 945

(56) References Cited

U.S. PATENT DOCUMENTS

| | | |
|---|---|---|
| 2,465,319 | 3/1949 | Whinfield et al. . |
| 2,720,502 | 10/1955 | Caldwell . |
| 2,727,881 | 12/1955 | Caldwell et al. . |
| 2,822,348 | 2/1958 | Haslam . |
| 3,047,539 | 7/1962 | Pengilly . |
| 3,671,487 | 6/1972 | Abolins . |
| 3,953,394 | 4/1976 | Fox et al. . |
| 4,128,526 | 12/1978 | Borman . |
| 4,578,329 | 3/1986 | Holsappel . |
| 4,595,647 | 6/1986 | Spanjer . |
| 4,636,544 | 1/1987 | Hepp . |
| 4,816,374 | 3/1989 | Lecomte . |
| 5,063,137 | 11/1991 | Kiyonari et al. . |
| 5,489,639 | 2/1996 | Faber et al. . |

FOREIGN PATENT DOCUMENTS

| | | |
|---|---|---|
| 0 111 357 B2 | 6/1990 | (EP) . |
| 0 675 001 A1 | 10/1995 | (EP) . |
| 0 676 442 | 10/1995 | (EP) . |
| WO 94 12352 | 6/1994 | (WO) . |

OTHER PUBLICATIONS

T. Kilp, Laser Marking of Plastics, Annu. Tech. Conf. Soc. Plast. Eng. (1991), 49th, 1901–1903.

*Primary Examiner*—Patrick D. Niland

(57) ABSTRACT

A resin composition having laser marking properties from a NdYAG radiation laser wherein said composition comprises a polyester thermoplastic resin, a sufficient amount of light pigment for forming a light background coloration, and an effective amount of marking agent wherein said polyester thermoplastic resin decomposes in laser struck areas to form dark colored markings in laser struck areas on the light background coloration wherein the marking agent is selected from the group consisting of boron phosphate, zinc oxide, zinc stannate, zinc hydroxy stannate, tin (II) oxalate and mixtures thereof.

14 Claims, No Drawings

COMPOSITION FOR LASER MARKING

FIELD OF THE INVENTION

This invention relates to a resin composition suitable for marking with a laser and a method for laser marking.

BACKGROUND OF THE INVENTION

The laser beam provides a means of writing, bar coding and decorative marking of plastics. This technique is advantageous over current printing technologies because of the ease at which the layout can be adjusted using graphic computer programs and also integrated into the production line. Laser marking enables a contact-free procedure even on soft, irregular surfaces that are not readily accessible. In addition it is ink-free which makes it long-lasting and solvent-free and, thus, more friendly to the environment. Speeds up to 10,000mm/sec are possible with a $CO_2$ laser while Nd-YAG laser allows up to 2000 mm/sec.

There are several laser types available for marking plastic surfaces. The Excimer laser with the frequency in the range of 196–351 nm leads to the marking of plastic surfaces by photochemical ablation or reaction. Using Nd-YAG laser at lower power levels at 532 nm provides laser marking by leaching or selective bleaching of dyes and pigments while the NdYAG laser at 1064 nm leads to laser marking by carbonization, sublimation, discoloration, foaming and engraving. The $CO_2$ laser at 10600 nm enables laser marking by thermochemical reaction, melting, vaporizing and engraving.

In one type of laser marking it is desirable to obtain a light contrast on a dark background. Carbon black which decomposes into volatile components after absorbing the laser light may be utilized. These volatile components foam the surface leading to scattering of light and thus a light impression. EP 0 675 001 to Kato describes the use of zinc borate as a contrast enhancing additive. Zinc borate releases its water. U.S. Pat. No. 4,595,647 to Spanjer describes a laser markable material useful for encapsulation of electronic devices that is obtained by adding $TiO_2$ or $TiO_2+CrO_3$ to common plastic encapsulants formed from a mixture of a resin+filler+carbon black+mold release agent. When irradiated by a $CO_2$ laser, the originally grey material turns bright gold, providing a high contrast durable mark. Desirable concentrations are described, in weight percent of the compound, as 1–5% $TiO_2$ and 0–3% $CrO_3$, with 1–3% $TiO_2$ and 0.5–2% $CrO_3$ being preferred. Carbon black is optional but a concentration in the range 0.1–3% by weight is desirable with 0.5–1% preferred.

U.S. Pat. No. 5,063,137 to Kiyonari et al. describes the use of an anhydrous metal borate salt, an anhydrous metal phosphate salt, a phosphoric acid-containing glass, basic zinc carbonate and basic magnesium carbonate with a resin to give a white marking on a dark background.

It is also desirable to form a dark contrast on a light background. EP 0 111 357 uses metal silicates to obtain black markings on articles having a polyolefin surface. U.S. Pat. No. 4,578,329 to Holsappel describes the use of a silicon compound, preferably a metal silicate, e.g. calcium-metasilicate or kaoline to give a black mark in the laser struck areas of a polyolefin.

U.S. Pat. No. 5,489,639 to Faber et al describes the use of copper phosphate, copper sulfate and copper thiocyanate with a thermoplastic resin to give dark markings.

U.S. Pat. No. 4,816,374 to Lacomta describes the use of lead iodide, lead carbonate, lead sulfide, dioxin isocyanate, antimony; related compounds and mixtures with polyolefins.

T. Kilp, "Laser marking of Plastics', Annu. Tech. Conf. Soc. Plast. Eng, (1991), 49th, 1901–1903, describes the effects of different silicates on the laser marking of polyolefins. Kaolin gave white marks on colored substrates while black marks were obtained when mica or titanium dioxide were incorporated into the substrate.

It is desirable to make further improvements in laser marking materials of the polyester type. In particular, a desired color combination is a light background color and a dark contrast color in the laser treated areas. In particular, it is desirable to obtain a dark contrast color in the laser treated areas using a NdYAG laser.

SUMMARY OF THE INVENTION

Hence, the object act of this invention is to provide polyester resin compositions containing ingredients selected to enhance the laser marking of resins with the NdYAG laser so light background coloration can be achieved with distinct and secure dark colored markings in the laser treated areas.

According to the present invention, a resin composition having laser marking properties with the NdYAG laser radiation comprises a polyester thermoplastic resin, a sufficient amount of light pigment for forming a light background coloration, and an effective amount of marking agent wherein said polyester thermoplastic resin decomposes in laser struck areas to form dark colored markings in laser struck areas. The marking agent is selected from the group consisting of boron phosphate, zinc oxide, zinc stannate, zinc hydroxy stannate, tin (II) oxalate and mixtures thereof.

DETAILED DESCRIPTION OF THE PREFERRED EMBODIMENTS

In accordance with the principles of the present invention, the marking agent is selected from the group consisting of boron phosphate, zinc oxide, zinc stannate, zinc hydroxy stannate, tin (II) oxalate and mixtures thereof.

The exact nature of the mechanism by which these additives work is not yet established. It is thought to be a combination of increased absorption of the laser light and an increased tendency towards carbonization.

Additionally the resin contains a sufficient amount of light pigment for forming a light background coloration. This pigmentation can be in the form of various pigments and dyes such as set forth in the examples that are compatible with the resin. Pigments are generally present in an amount from 0.01 to 4 percent by weight.

Polyesters include those comprising structural units of the following formula:

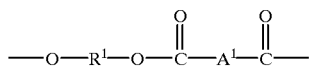

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of the above formula are poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end-use of the composition.

The $R^1$ radical may be, for example, a $C_{2-10}$ alkylene radical, a $C_{6-12}$ alicyclic radical, a $C_{6-20}$ aromatic radical or a polyoxyalkylene radical in which the alkylene groups contain about 2–6 and most often 2 or 4 carbon atoms. The $A^1$ radical in the above formula is most often p- or m-phenylene, a cycloaliphatic or a mixture thereof. This class of polyester includes the poly(alkylene terephthalates). Such polyesters are known in the art as illustrated by the following patents, which are incorporated herein by reference.

| | | | |
|---|---|---|---|
| 2,465,319 | 2,720,502 | 2,727,881 | 2,822,348 |
| 3,047,539 | 3,671,487 | 3,953,394 | 4,128,526 |

Examples of aromatic dicarboxylic acids represented by the dicarboxylated residue $A^1$ are isophthalic or terephthalic acid, 1,2-di(p-carboxyphenyl)ethane, 4,4'-dicarboxydiphenyl ether, 4,4"bisbenzoic acid and mixtures thereof. Acids containing fused rings can also be present, such as in 1,4- 1,5- or 2,6- naphthalenedicarboxylic acids. The preferred dicarboxylic acids are terephthalic acid, isophthalic acid, naphthalene dicarboxylic acid, cyclohexane dicarboxylic acid or mixtures thereof.

The most preferred polyesters are poly(ethylene terephthalate) ("PET"), and poly(1,4-butylene terephthalate), ("PBT"), poly(ethylene naphthanoate) ("PEN"), poly(butylene naphthanoate), ("PBN") and (polypropylene terephthalate) ("PPT"), and mixtures thereof.

Also contemplated herein are the above polyesters with minor amounts, e.g., from about 0.5 to about 5 percent by weight, of units derived from aliphatic acid and/or aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

The preferred poly(1,4-butylene terephthalate) resin used in this invention is one obtained by polymerizing a glycol component at least 70 mol %, preferably at least 80 mol %, of which consists of tetramethylene glycol and an acid or ester component at least 70 mol %, preferably at least 80 mol %, of which consists of terephthalic acid, and polyester-forming derivatives therefore.

The polyesters used herein have an intrinsic viscosity of from about 0.4 to about 2.0 dl/g as measured in a 60:40 phenol/tetrachloroethane mixture or similar solvent at 23°–30°C. Preferably the intrinsic viscosity is 1.1 to 1.4 dl/g. VALOX Registered TM 325 polyester is particularly suitable for this invention.

From the above description, it is apparent that, according to the present invention, compositions which contain laser marking additives form more distinct marks by means of laser light irradiation than in the case of compositions containing just one or neither of these.

Additionally, the preferred resin compositions of the present invention may include reinforcing glass fibers. The fibrous glass comprises from 5 to 40 weight percent, preferably from about 10 to about 30 percent by weight based on the total weight. The glass fiber or filamentous glass is desirable employed as reinforcement in the present compositions. Glass that is relatively soda free is preferred. The low soda glass known as "C" glass may be utilized. For electrical uses, fibrous glass filaments comprised of lime-aluminum borosilicate glass that is relatively soda-free which is known as "E" glass may be used. The filaments are made by standard processes, e.g., by steam or air blowing, flame blowing and mechanical pulling. The preferred filaments for plastic reinforcement are made by mechanical pulling. The filament diameters range from about 3 to 30 microns inch but this is not critical to the present invention.

In preparing the molding compositions it is convenient to use the filamentous glass in the form of chopped strands of from about ⅛" to about ½" long. In articles molded from the compositions on the other hand, even shorter lengths will be encountered because, during compounding considerable fragmentation will occur. This is desirable, however, because the best properties are exhibited by thermoplastic injection molded articles in which the filament lengths lie between about 0.000005" and 0.125 (⅛").

Additionally, flame-retardant may be added. The amount of flame-retardant additive should be present in an amount at least sufficient to reduce the flammability of the polyester resin, preferably to a UL94 V-0 rating. The amount will vary with the nature of the resin and with the efficiency of the additive. In general, however, the amount of additive will be from 2 to 20 percent by weight based on the weight of resin. A preferred range will be from about 5 to 15 percent.

Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly (haloaryl acrylate), poly (haloaryl methacrylate), or mixtures thereof. Poly (haloaryl acrylate) is preferred with the most preferably being poly (pentabromobenzyl acrylate). PBB-PA has been known for some time, and is a valuable flame-retardant material, useful in a number of synthetic resins. PBB-PA is prepared by the polymerization of pentabromobenzyl acrylate ester (PBB-MA). The PBB-PA polymeric flame-retardant material is incorporated into the synthetic resin during processing to impart flame retardant characteristics.

Examples of other flame retardants are brominated polystyrenes such as polydibromostyrene and polytribromostyrene, decabromobiphenyl ethane, tetrabromobiphenyl, brominated alpha , omega -alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins. Other aromatic carbonate flame retardants are set forth in U.S. Pat. No. 4,636,544 to Hepp.

Flame retardants are typically used with a synergist, particularity inorganic antimony compounds. Such compounds are widely available or can be made in known ways. Typical, inorganic synergist compounds include $Sb_2O_5$; $SbS_3$; and the like. Especially preferred is antimony trioxide ($Sb_2O_3$). Synergists such as antimony oxides, are typically used at about 0.5 to 15, and more preferably from 1 to 6 percent by weight based on the weight percent of resin in the final composition.

In an effort to avoid the utilization of antimony compounds, is preferable not to use the halogenated flame retardants and the antimony synergtist. Preferably non-halogenated flame retardants are utilized. Typical non-halogenated flame retardant includes phosphorus containing compositions such as phosphoric acids, pyro/polyphosphates, and organic esters of phosphinic and phosphonic acids. Phosphoric acids include phosphoric acid, pyrophosphoric acid through metaphosphoric acid having the formula:

(I) $H_{m+2}P_mO_{3m+1}$

Pyro/polyphosphate selected from the group consisting of metal pyrophosphates, metal polyphosphates, metal acid pyrophosphates, metal acid polyphosphates, and mixtures thereof. Preferably the pyro/polyphosphate has the formula (I):

$$M^z{}_xH_yP_nO_{3n+1} \qquad (I)$$

wherein M is a metal, x is a number from 1 to 12, y is a number from 0 to 12, n is a number from 2 to 10, z is a number from 1 to 5 and the sum of (xz)+y is equal to n+2. M is preferably a Group IA, IIA, IB or IIB metal and more preferably sodium or potassium. These compounds include, for example, pyrophosphates of the formula $Na_3HP_2O_7$; $K_2H_2P_2O_7$; $Na_3H_2P_2O_{10}$; $KNaH_2P_2O_7$ and $Na_2H_2P_2O_7$ or sodium hexameta phosphate, $Na_8P_{6O19}$. Typically, the metal pyro/polyphosphates are hydrates and may be in powder form. Sodium acid pyrophosphate is the most preferred.

Other phosphorus containing compositions include the organic esters of phosphinic and phosphonic acids having the following general formula:

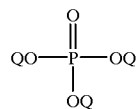

wherein each Q represents the same or different radicals including hydrocarbon radicals such as alkyl, cycloalkyl, aryl, alkyl substituted aryl and aryl substituted alkyl, halogen; hydrogen and combinations thereof provided that at least one Q is an organic radical. Typical examples of phosphates include triphenyl phosphene oxide, phenylbisdodecyl phosphate, phenylbisneopentyl phosphate, phenylethylene hydrogen phosphate.

The phosphorus component is present in the flame retarded molding compositions in an amount effective to enhance the flame retardancy but not in such amount that other essential properties of the molding composition are substantially degraded. Typical amounts are from about 0.02 to about 5, preferably from about 0.2 to about 2 percent and more preferably from about 0.2 to about 1 percent of the phosphorous containing component calculated as atomic phosphorous.

Other ingredients employed in low amounts, typically less than 5 percent by weight of the total composition, include stabilizers, lubricants, colorants, plasticizers, nucleants, antioxidants and UV absorbers. These ingredients should be selected so as not to deleteriously affect the desired properties of the molded resin.

Although it is not essential, best results are obtained if the ingredients are precompounded, pelletized and then molded. Precompounding can be carried out in conventional equipment. For example, after predrying the polyester resin, other ingredients, and, optionally, other additives and/or reinforcements, a single screw extruder is fed with a dry blend of the composition. On the other hand, a twin screw extrusion machine can be fed with resins and additives at the feed port and reinforcement down stream.

Portions of the blend can be precompounded and then, extruded with the remainder of the formulation, and cut or chopped into molding compounds, such as conventional granules, pellets, etc. by standard techniques.

Distinct and secure marking can be carried out on the resin compositions of the present invention by means of laser irradiation.

EXAMPLES

The formulations shown below were preblended and extruded on a intermeshing-corotating twin-screw extruder at a die head temperature of 250°C. The extrudate was cooled through a water bath prior to pelletizing. Test parts were injection molded on a 3 oz. Engel injection molding machine with a set temperature of approximately 240–260° C. The resin was dried for 3–4 hours at 120 degrees Centigrade in a forced air circulating oven prior to injection molding.

The formulation of the Examples are particularly useful with a NdYAG type laser.

In the Examples the following laser marking agents were utilized.

| | | |
|---|---|---|
| Boron Phosphate-Anhydrous | Budenheim | Budit 321 |
| Zinc Oxide | Aldrich Chemicals | Cat. no. 20,553-2 |
| Tin(II) Oxalate | Aldrich Chemicals | Cat. no. 40,276-1 |
| Zinc Stannate | International Tin Research Institute | Zinc Stannate |
| Zinc Hydroxy Stannate | International Tin Research Institute | Zinc HydroxyStannate |

Polyester Valox ® 325M resin available from General Electric Company

For comparison purposes $Sb_2O_3$ is included in the table. It is desirable to utilize compositions other than $Sb_2O_3$ which produce similar color contrast but may be environmentally safer.

TABLE 1

Examples of the Invention. Laser marking contrast as measured on squares of 10 x 10 mm vs. laser marking speed

| | Example 1 | Example 2 | Example 3 | Example 4 | Example 5 | Example 6 |
|---|---|---|---|---|---|---|
| Composition | | | | | | |
| Polyster*** | 100 | 100 | 100 | 100 | 100 | 100 |
| Boron phosphate | 3.1 | 5.2 | | | | |
| Zinc oxide | | | 3.1 | | | |

TABLE 1-continued

Examples of the Invention. Laser marking contrast as measured on squares of 10 × 10 mm vs. laser marking speed

|  | Example 1 | Example 2 | Example 3 | Example 4 | Example 5 | Example 6 |
|---|---|---|---|---|---|---|
| Zinc stannate |  |  |  | 3.1 |  |  |
| Zinc hydroxide stannate |  |  |  |  | 3.1 |  |
| Tin(II) oxalate |  |  |  |  |  | 3.1 |
| Laser Marking Results |  |  |  |  |  |  |
| Speed 350 mm/s dE** | 38 | 37.9 | 47.6 | 43.5 | 46 | 43.4 |
| CR*** | 4.5 | 4.5 | 5.4 | 5.2 | 5.7 | 4.7 |
| Speed 500 mm/s dE** | 40.1 | 40 | 41.4 | 41.6 | 38.9 | 41.7 |
| CR*** | 5.1 | 5 | 4.2 | 4.7 | 4.1 | 4.4 |
| Speed 750 mm/s dE** | 32.9 | 32.3 | 27.2 | 31.3 | 20.2 | 29.8 |
| CR*** | 3.4 | 3.4 | 2.4 | 3 | 1.9 | 2.6 |

TABLE 2

Pigmented Examples. The pigments set forth have been added to give a grey/grey-greenish color. Laser marking contrast as measured on laser marked squares of 10 × 10 mm. Laser: NdYAG 1064/532 nm Carl Baasel laser, Settings: 1064 nm, 16A, 5000 Hz, 800 mm/s and modeblended 1.6

|  | Control. | Example 7 | Example 8 | Example 9 | Example 10 |
|---|---|---|---|---|---|
| Composition in pbw |  |  |  |  |  |
| Polyester**** | 100 | 100 | 100 | 100 | 100 |
| Zinc Oxide |  | 3.1 | 5.2 |  |  |
| Zinc stannate |  |  |  | 3.1 | 5.2 |
| Sicotan Gelb K1011 | 0.075 | 0.075 | 0.075 | 0.075 | 0.075 |
| Sicotan K2001 FG | 0.075 | 0.075 | 0.075 | 0.075 | 0.075 |
| Printex 85 Fluffy | 0.00375 | 0.00375 | 0.00375 | 0.00375 | 0.00375 |
| Sachtolith HDS | 0.9 | 0.9 | 0.9 | 0.9 | 0.9 |
| Laser marking results |  |  |  |  |  |
| CR** | 1.96 | 2.14 | 2.51 | 2.51 | 2.99 |

TABLE 3

Comparative Examples. Laser marking contrast as measured on squares of 10 × 10 mm vs. laser marking speed.

| Composition | Comparative A | Comparative B |
|---|---|---|
| Polyester**** | 100 | 100 |
| Antimony trioxide |  | 3.1 |
| Laser Marking Results |  |  |
| Speed 350 mm/s dE** | 43.5 | 45.3 |
| CR*** | 5 | 5 |
| Speed 500 mm/s dE** | 26.2 | 46.2 |
| CR*** | 2.4 | 5.2 |
| Speed 750 mm/s dE** | 7.2 | 41.1 |
| CR*** | 1.2 | 4.1 |

****Polyester used was Valox ® polyester resin grade 325M-1001, natural 325M, no color pigments added
**dE color difference between laser marked and non-laser marked part according to the CieLab method, DIN 6174, source
***Contrast ratio (CR) calculated by dividing the Y value of the background color by the Y value of the laser Y is measured according to Cielab Method, DIN 6174, source D65

What is claimed is:

1. A resin composition having laser marking properties from a NdYAG radiation laser wherein said composition comprises a polyester thermoplastic resin, a sufficient amount of light pigment for forming a light background coloration, and an effective amount of marking agent wherein said polyester thermoplastic resin decomposes in laser struck areas to form dark colored markings in laser struck areas on the light background coloration wherein said marking agent is present in an amount of from about 1 to about 5 percent by weight based on the weight of the total weight of the resin composition and selected from the group consisting of boron phosphate, zinc oxide, zinc stannate, zinc hydroxy stannate, tin (II) oxalate and mixtures thereof.

2. A resin composition having laser marking properties according to claim 1 wherein said marking agent is present in an amount from 1 to 3 percent by weight based on the total weight of the composition.

3. A resin composition having laser marking properties according to claim 1 wherein said marking agent consist essentially of boron phosphate.

4. A resin composition having laser marking properties according to claim 1 wherein said marking agent consist essentially of zinc oxide.

5. A resin composition having laser marking properties according to claim 1 wherein said marking agent consist essentially of zinc stannate.

6. A resin composition having laser marking properties according to claim 1 wherein said marking agent consist essentially of zinc hydroxy stannate.

7. A resin composition having laser marking properties according to claim 1 wherein said marking agent consist essentially of tin (II) oxalate.

8. A resin composition having laser marking properties according to claim 1 wherein said polyester composition comprises structural units of the following formula:

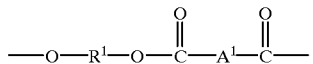

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof.

9. A resin composition having laser marking properties according to claim 1 additionally including reinforcing glass fibers.

10. A resin composition having laser marking properties according to claim 9 wherein said glass fibers comprise from 5 to 40 weight percent based on the total weight of the resin composition.

11. A molded article having laser radiated marked surface portions, said article comprising a resin composition having laser marking properties which resin compositions comprises a polyester thermoplastic resin, a sufficient amount of light pigment for forming a light background coloration, and an effective amount of marking agent wherein said polyester thermoplastic resin decomposes in laser struck areas to form dark colored markings in laser struck areas on the light background coloration wherein said marking agent is present in an amount of from about 1 to about 5 percent by weight based on the total weight of the resin composition and is selected from the group consisting of boron phosphate, zinc oxide, zinc stannate, zinc hydroxy stannate, tin (II) oxalate and mixtures thereof.

12. A resin composition having laser marking properties wherein said polyester therein of claim 11 comprises structural units of the following formula:

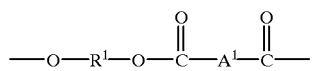

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof.

13. A resin composition of claim 11 having laser marking properties additionally including reinforcing glass fibers.

14. A polyester resin composition of claim 13 having laser marking properties wherein said fibrous glass comprises from 5 to 40 weight percent based on the total weight of the resin composition.

* * * * *